US012099429B2

(12) United States Patent
Namuduru et al.

(10) Patent No.: US 12,099,429 B2
(45) Date of Patent: Sep. 24, 2024

(54) SYSTEMS, METHODS, AND APPARATUSES FOR IDENTIFYING, LOGGING AND REPORTING APPLICATION EVENTS IN AN ELECTRONIC NETWORK

(71) Applicant: BANK OF AMERICA CORPORATION, Charlotte, NC (US)

(72) Inventors: Tejaswi Ramana Namuduru, Charlotte, NC (US); Raghav Shenoy, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 42 days.

(21) Appl. No.: 18/074,014

(22) Filed: Dec. 2, 2022

(65) Prior Publication Data

US 2024/0184683 A1 Jun. 6, 2024

(51) Int. Cl.
G06F 9/44 (2018.01)
G06F 11/34 (2006.01)

(52) U.S. Cl.
CPC ...... *G06F 11/3476* (2013.01); *G06F 11/3438* (2013.01)

(58) Field of Classification Search
None
See application file for complete search history.

(56) References Cited

U.S. PATENT DOCUMENTS

| 7,305,709 | B1 | 12/2007 | Lymer |
| 7,818,419 | B1 | 10/2010 | McAllister |
| 7,912,965 | B2 | 3/2011 | Wahl |
| 8,484,568 | B2 | 7/2013 | Rados |
| 9,258,374 | B2 * | 2/2016 | Mankovskii ......... H04L 67/535 |
| 9,274,858 | B2 | 3/2016 | Milliron |
| 10,116,670 | B2 | 10/2018 | Muddu |
| 10,180,980 | B2 * | 1/2019 | Khan ................... G06F 16/951 |
| 10,187,483 | B2 * | 1/2019 | Golub .................... H04L 67/53 |
| 10,581,891 | B1 | 3/2020 | Kapoor |
| 10,671,452 | B2 | 6/2020 | Milliron |
| 10,679,206 | B2 | 6/2020 | Laracey |

(Continued)

FOREIGN PATENT DOCUMENTS

AU 2016204072 A1 1/2017

*Primary Examiner* — Qamrun Nahar
(74) *Attorney, Agent, or Firm* — Moore & Van Allen PLLC; Lauren M. Stokes

(57) ABSTRACT

Systems, computer program products, and methods are described herein for identifying, logging and reporting application events in an electronic network. The present invention is configured to receive at least one user interaction associated with at least one application, wherein the user interaction comprises a user identifier associated with a user account and an interaction identifier associated with the at least one user interaction; determine at least one interaction keyword based on the at least one user interaction; generate a specific interaction log comprising the at least one user interaction and the at least one interaction keyword; and generate a query dashboard comprising at least a plurality of interaction logs, wherein the plurality of interaction logs comprises at least the specific interaction log and an associated application identifier based on the at least one application and at least a second interaction log associated with at least a second application.

20 Claims, 6 Drawing Sheets

(56) References Cited

U.S. PATENT DOCUMENTS

| | | |
|---|---|---|
| 10,726,009 B2 | 7/2020 | Pal |
| 11,057,482 B2 | 7/2021 | Howett |
| 11,265,329 B2 | 3/2022 | Koottayi |
| 11,379,275 B2 | 7/2022 | Milliron |
| 11,423,143 B1 | 8/2022 | Lin |
| 2009/0177675 A1 | 7/2009 | Trumbull |
| 2013/0219307 A1 | 8/2013 | Raber |
| 2014/0250049 A1 | 9/2014 | Lospinoso |
| 2017/0242740 A1* | 8/2017 | Bell .................... G06F 11/3438 |
| 2020/0260216 A1 | 8/2020 | Davis |
| 2022/0122183 A1* | 4/2022 | Jacob ................. G06F 11/3438 |
| 2022/0344042 A1 | 10/2022 | McCrea |

\* cited by examiner

SYSTEMS, METHODS, AND APPARATUSES FOR IDENTIFYING, LOGGING AND REPORTING APPLICATION EVENTS IN AN ELECTRONIC NETWORK

FIELD OF THE INVENTION

The present invention embraces a system for identifying, logging and reporting application events in an electronic network.

BACKGROUND

Managers of electronic networks having many applications in communication over the electronic network have a harder time than ever tracking user interactions and application success rates based off each user interaction in a broad, accurate, efficient, and dynamic way. For instance, managers of electronic networks may wish to know immediately when an application drops below a certain success rating-which may indicate an immediate issue with the application itself and/or with users interacting with the applications—and wish to know all the data regarding each of the user interactions with the application before and during its failure. A need, therefore, exists for a system to broadly, accurately, efficiently, and dynamically identify, track, and report application events in an electronic network.

Applicant has identified a number of deficiencies and problems associated with identifying, logging and reporting application events in an electronic network. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for identifying, logging and reporting application events is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: receive at least one user interaction associated with at least one application, wherein the user interaction comprises a user identifier associated with a user account and an interaction identifier associated with the at least one user interaction; determine at least one interaction keyword based on the at least one user interaction; generate a specific interaction log comprising the at least one user interaction and the at least one interaction keyword; and generate a query dashboard comprising at least a plurality of interaction logs, wherein the plurality of interaction logs comprises at least the specific interaction log and an associated application identifier based on the at least one application and at least a second interaction log associated with at least a second application.

In some embodiments, the user identifier is a globally unique identifier.

In some embodiments, the interaction identifier is a universally unique identifier.

In some embodiments, the at least one interaction keyword is based on a comparison of the at least one user interaction to an interaction keyword list. In some embodiments, the interaction keyword list comprises a list of application specific keywords, and wherein the list of application specific keywords comprise at least one specific keyword for a plurality of applications. In some embodiments, the processing device is further configured to: generate, based on the at least one interaction keyword and the application identifier, at least one key event; store the at least one key event with the user identifier and the interaction identifier; and generate a key event report associated with the application identifier, wherein the key event report comprises each user identifier and each interaction identifier associated with the application.

In some embodiments, the processing device is further configured to: receive a query request comprising a success rate query associated with an application identifier associated with the plurality of interaction logs; output a query response comprising a success rating of the application, wherein the success rating is based on the plurality of interaction logs associated with the application; and determine whether the success rating of the application fails to meet a success rating threshold. In some embodiments, the processing device is further configured to generate, based on the success rating failing to meet the success rating threshold, a failure alert interface component to configure a graphical user interface of a user device, wherein the failure alert interface component comprises the success rating of the application and the application identifier. In some embodiments, the failure interface component further comprises an application specific interaction log, wherein the application specific interaction log comprises each user interaction associated with the application and each user identifier associated with each user interaction. In some embodiments, the query dashboard comprises a three-part-key associated with the query request.

In some embodiments, the processing device is further configured to generate an interaction index for the plurality of interaction logs based on an associated application of each interaction keyword, wherein the interaction index comprises data associated with each interaction log of the plurality of interaction logs.

In another aspect, a computer program product for identifying, logging and reporting application events is provided. In some embodiments, the computer program product comprises at least one non-transitory computer-readable medium having computer-readable program code portions embodied therein, the computer-readable program code portions which when executed by a processing device are configured to cause a processor to: receive at least one user interaction associated with at least one application, wherein the user interaction comprises a user identifier associated with a user account and an interaction identifier associated with the at least one user interaction; determine at least one interaction keyword based on the at least one user interaction; generate a specific interaction log comprising the at least one user interaction and the at least one interaction keyword; and generate a query dashboard comprising at least a plurality of interaction logs, wherein the plurality of interaction logs comprises at least the specific interaction log and an associated application identifier based on the at least one application and at least a second interaction log associated with at least a second application.

In some embodiments, the at least one interaction keyword is based on a comparison of the at least one user interaction to an interaction keyword list. In some embodiments, the interaction keyword list comprises a list of application specific keywords, and wherein the list of application specific keywords comprise at least one specific keyword for a plurality of applications. In some embodiments, the processing device is further configured to cause the processor to: generate, based on the at least one interaction keyword and the application identifier, at least one key event; store the at least one key event with the user identifier and the interaction identifier; and generate a key event report associated with the application identifier, wherein the key event report comprises each user identifier and each interaction identifier associated with the application.

In some embodiments, the processing device is further configured to cause the processor to: receive a query request comprising a success rate query associated with an application identifier associated with the plurality of interaction logs; output a query response comprising a success rating of the application, wherein the success rating is based on the plurality of interaction logs associated with the application; and determine whether the success rating of the application fails to meet a success rating threshold.

In another aspect, a computer-implemented method for identifying, logging and reporting application events, the computer-implemented method comprising: receiving at least one user interaction associated with at least one application, wherein the user interaction comprises a user identifier associated with a user account and an interaction identifier associated with the at least one user interaction; determining at least one interaction keyword based on the at least one user interaction; generating a specific interaction log comprising the at least one user interaction and the at least one interaction keyword; and generating a query dashboard comprising at least a plurality of interaction logs, wherein the plurality of interaction logs comprises at least the specific interaction log and an associated application identifier based on the at least one application and at least a second interaction log associated with at least a second application.

In some embodiments, the at least one interaction keyword is based on a comparison of the at least one user interaction to an interaction keyword list. In some embodiments, the interaction keyword list comprises a list of application specific keywords, and wherein the list of application specific keywords comprise at least one specific keyword for a plurality of applications. In some embodiments, the computer-implemented method further comprises: generating, based on the at least one interaction keyword and the application identifier, at least one key event; storing the at least one key event with the user identifier and the interaction identifier; and generating a key event report associated with the application identifier, wherein the key event report comprises each user identifier and each interaction identifier associated with the application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
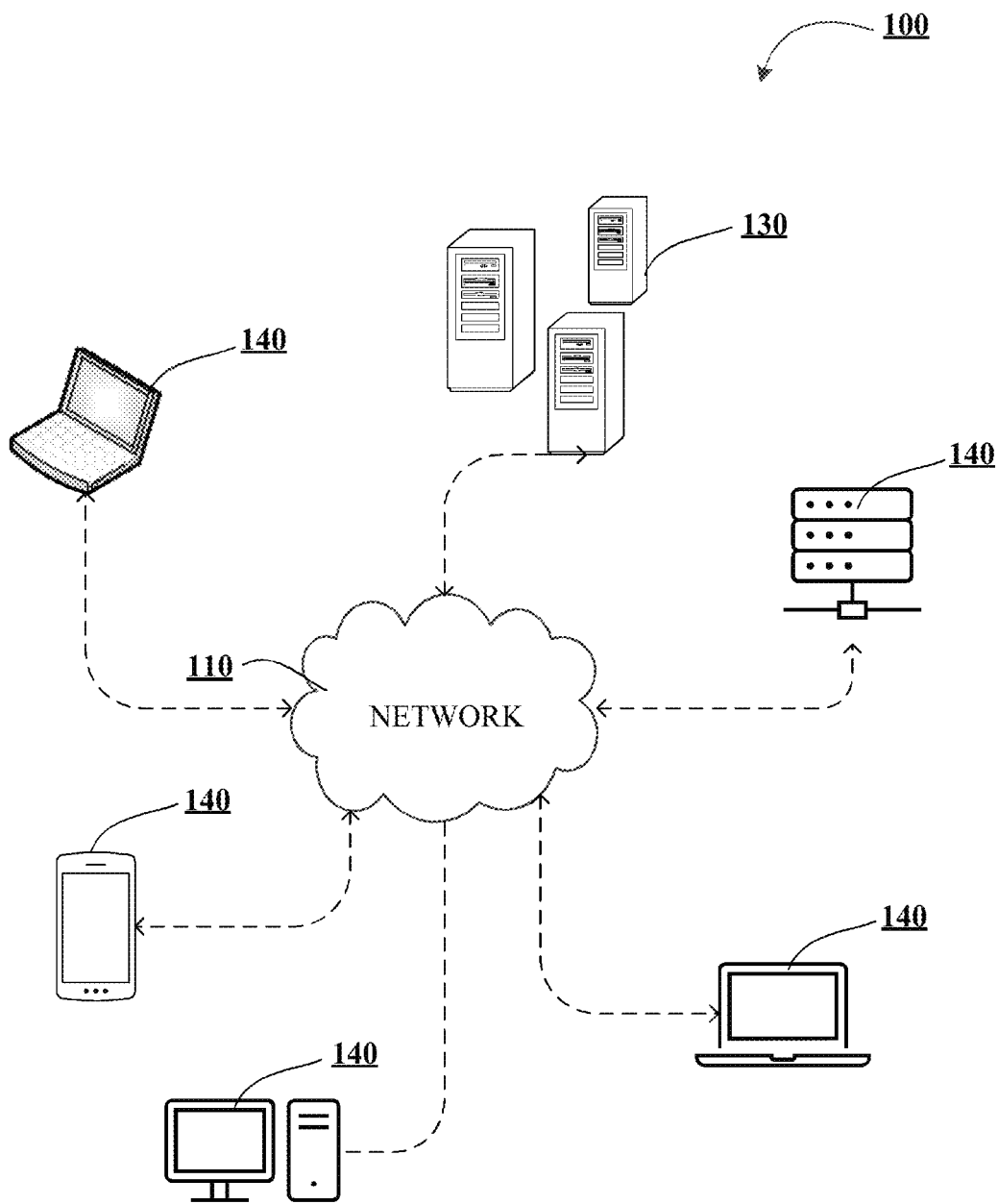
Figure 1B:
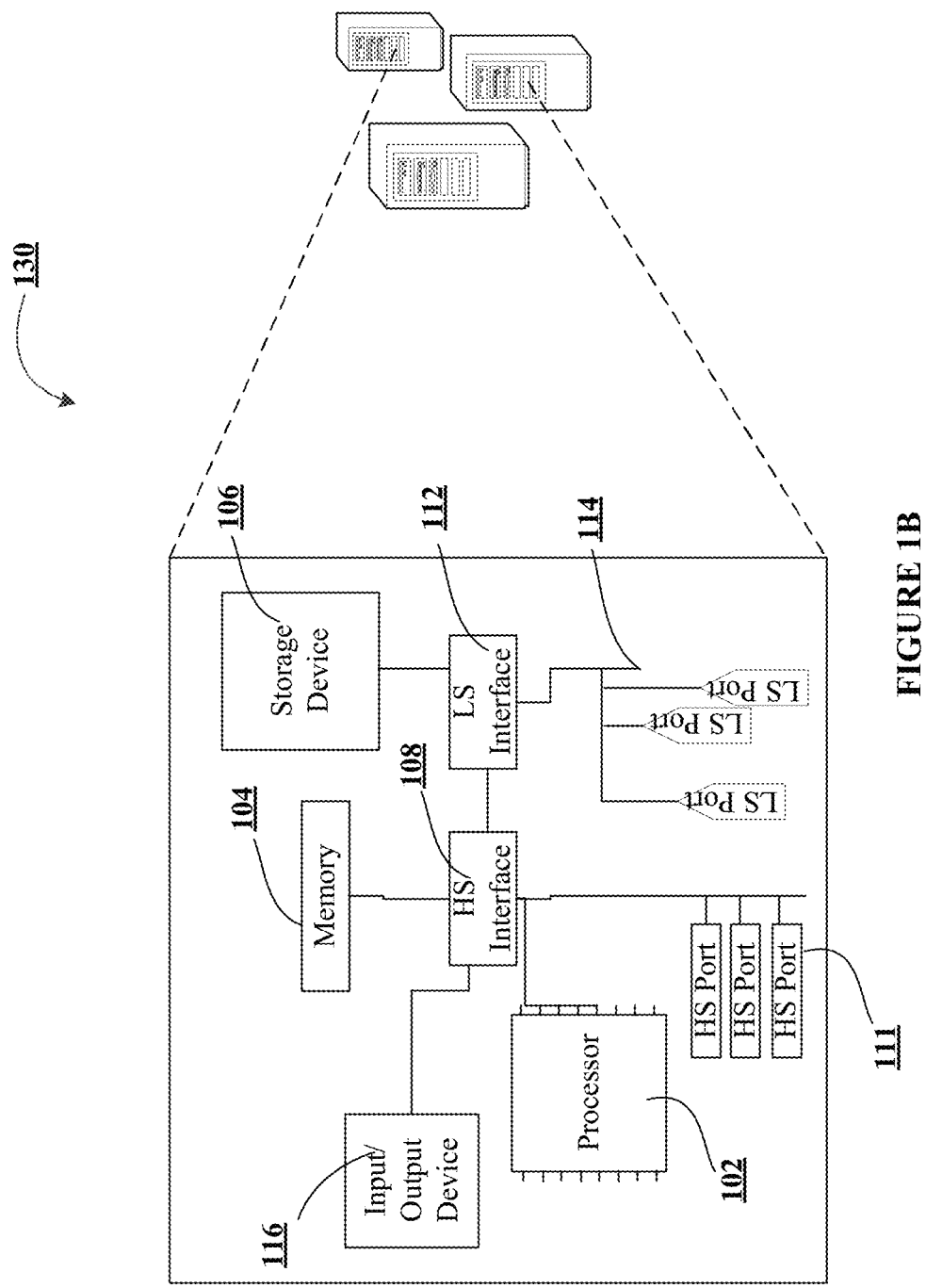
Figure 1C:
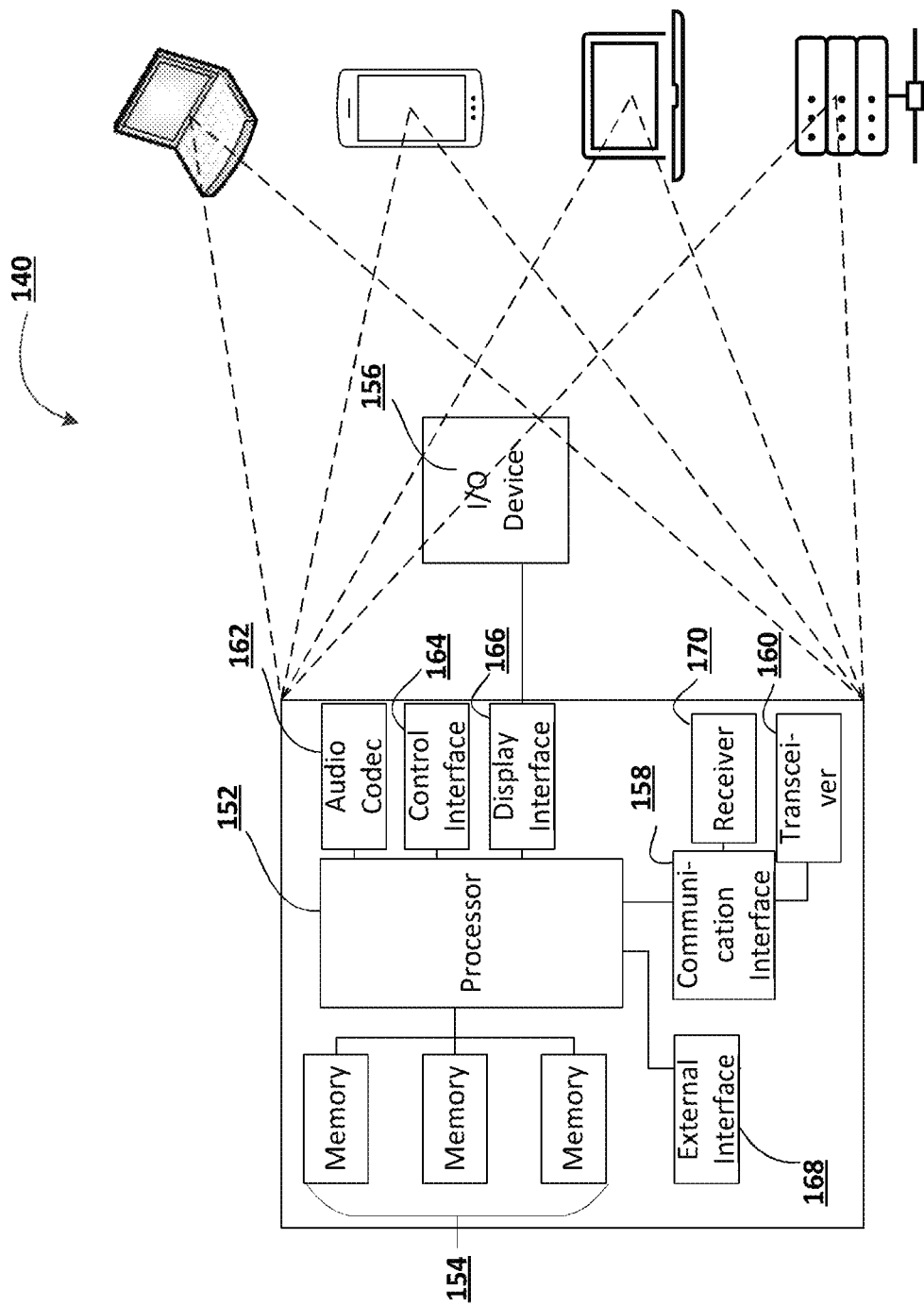
Figure 2:
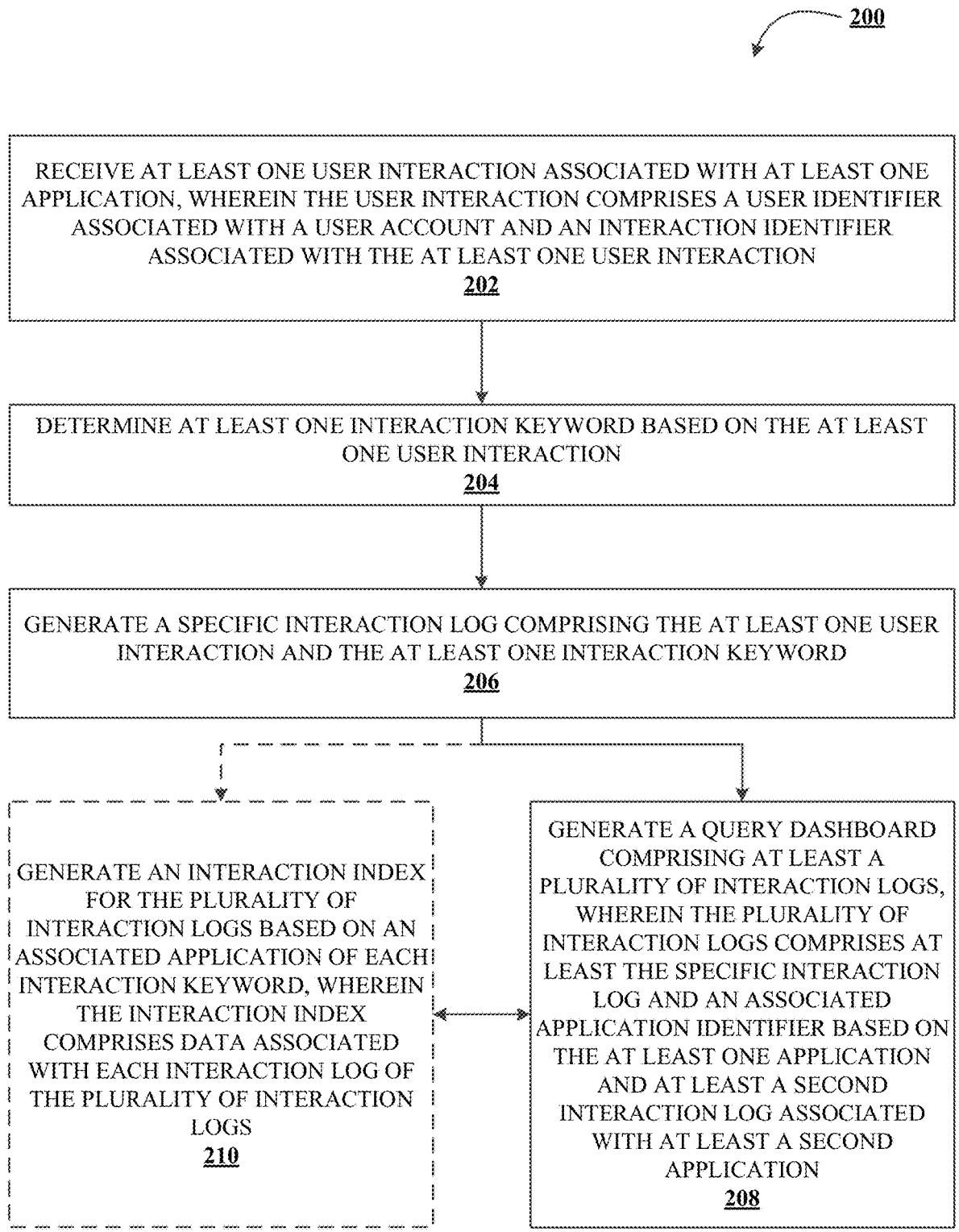
Figure 3:
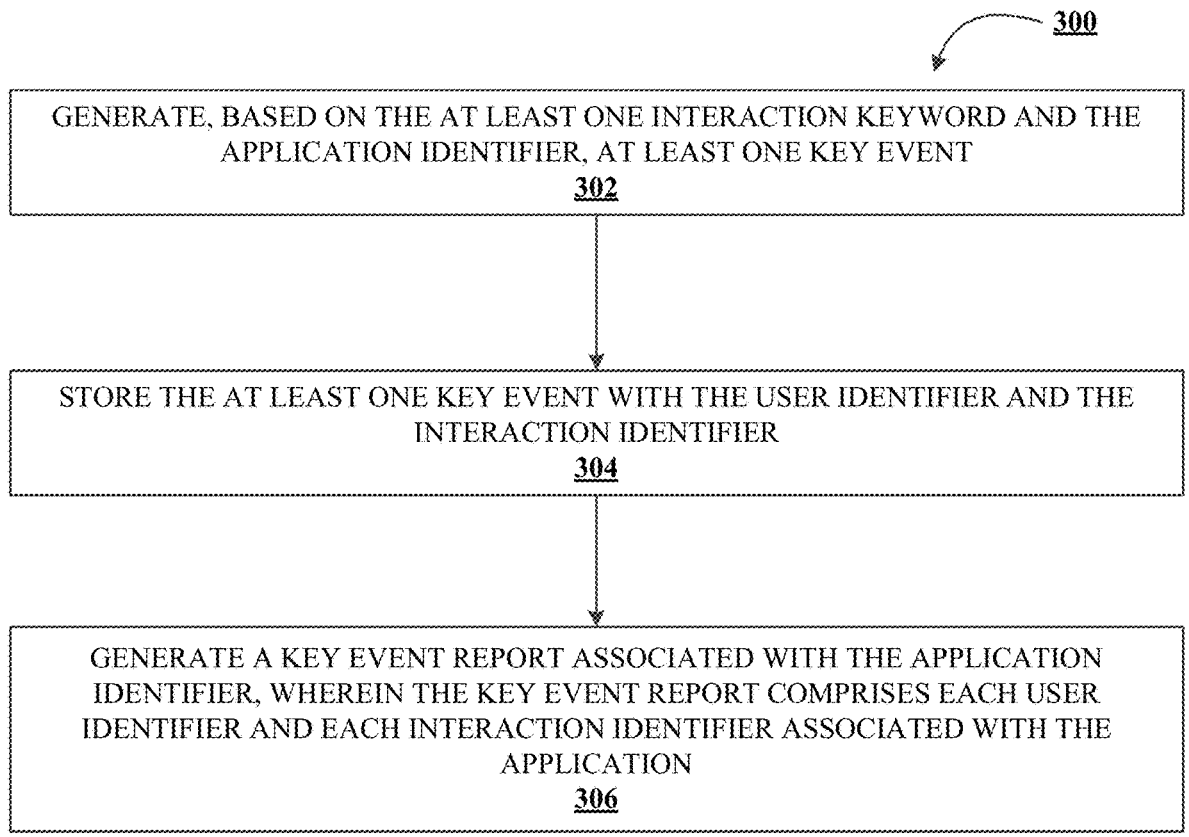
Figure 4:
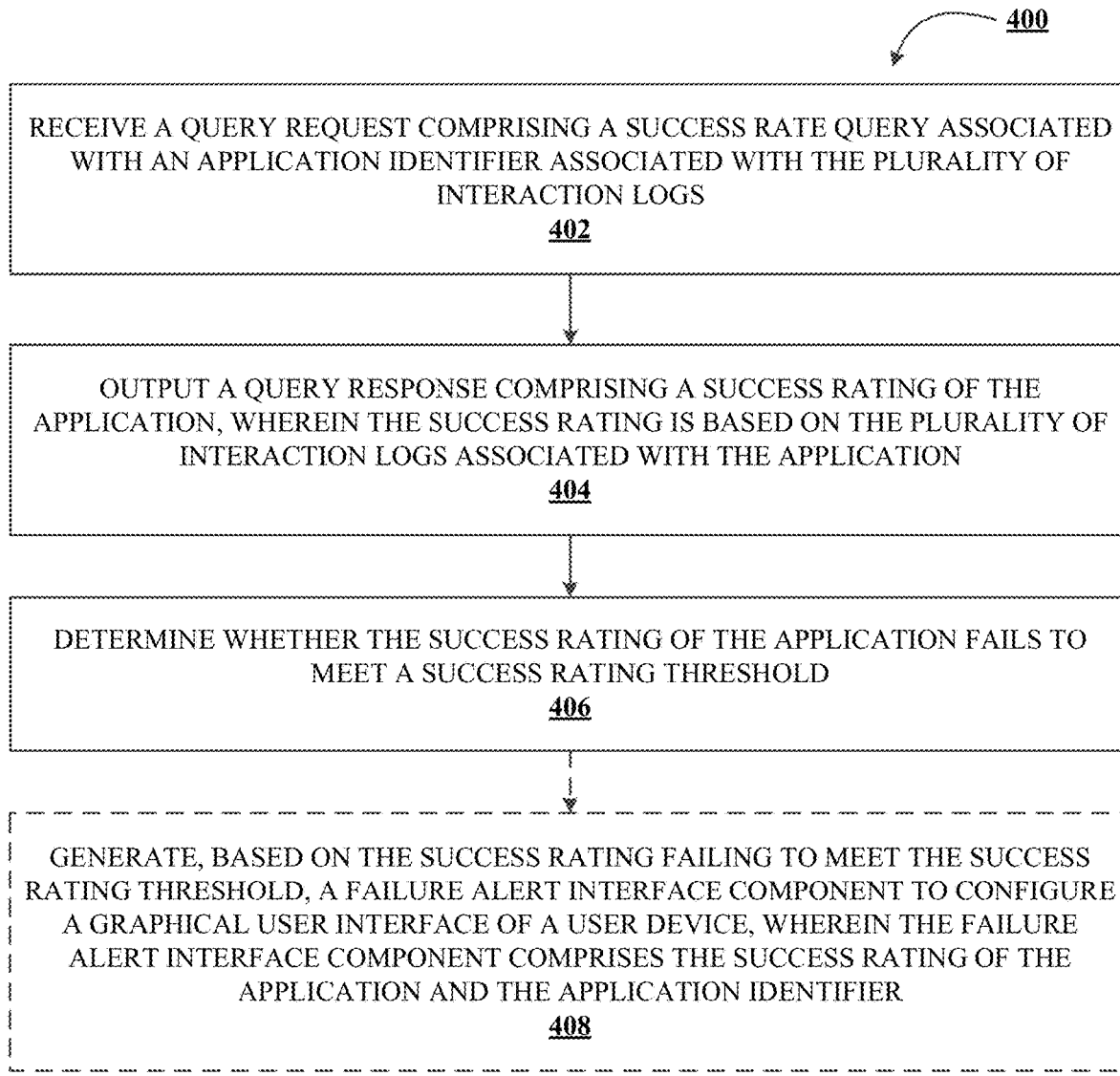

Having thus described embodiments of the invention in general terms, reference will now be made the accompanying drawings, wherein:

FIGS. 1A-1C illustrates technical components of an exemplary distributed computing environment for identifying, logging and reporting application events in an electronic network, in accordance with an embodiment of the invention;

FIG. 2 illustrates a process flow for identifying, logging and reporting application events in an electronic network, in accordance with an embodiment of the invention;

FIG. 3 illustrates a process flow for generating a key event report, in accordance with an embodiment of the invention; and FIG. 4 illustrates a process flow for determining and using a success rating and a success rating threshold, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/ rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Managers of electronic networks having many applications in communication over the electronic network have a harder time than ever tracking user interactions and application success rates based off each user interaction in a broad, accurate, efficient, and dynamic way. For instance, such managers of the electronic networks may wish to know immediately when an application drops below a certain success rating which may indicate an immediate issue with the application itself and/or with users interacting with the applications. A need, therefore, exists for a system to broadly, accurately, efficiently, and dynamically identify, track, and report application events in an electronic network.

As described in further detail herein, the present invention provides a solution to the above-referenced problems in the field of technology by generating a system (i.e., an application event system) to broadly, accurately, efficiently, and dynamically identify, track, and report application events in an electronic network. Such a system solves at least the technical problems in accurately determining each of an application's success ratings for electronic network and identifying and tracking all of the user interactions received for all of the applications. In this manner, the application event system solves the technical problems in accurately identifying, tracking, logging, and reporting all the interactions and events associated with all the applications in an electronic network. Such an application event system, thus, may solve the above-identified technical problems by at least receiving each of the user interactions associated with a plurality of applications of the electronic network, where the user interaction may comprise a unique user identifier and a unique interaction identifier. Based on the received user interaction, the application event system may determine an interaction keyword which is application-specific and generate—or update—a specific interaction log with the interaction keyword and the user interaction, where the specific interaction log may comprise all of the user interactions and associated data for each application. Further, the application event system may generate at least a query dashboard to receive a query request from a user of the application event system, such as a client of the application event system—where the client may oversee the electronic network and associated applications—and may generate a query response comprising data regarding each the application identified in the query request.

Accordingly, the present invention works by receiving at least one user interaction associated with at least one application, wherein the user interaction comprises a user identifier associated with a user account and an interaction identifier associated with the at least one user interaction; determining at least one interaction keyword based on the at least one user interaction; generating a specific interaction log comprising the at least one user interaction and the at least one interaction keyword; and generating a query dashboard comprising at least a plurality of interaction logs, wherein the plurality of interaction logs comprises at least the specific interaction log and an associated application identifier based on the at least one application and at least a second interaction log associated with at least a second application.

What is more, the present invention provides a technical solution to a technical problem. As described herein, the technical problem includes the broad, accurate, efficient, and dynamic identification, logging, and reporting of application events in an electronic network. The technical solution presented herein allows for an application event system that provides the broad, accurate, efficient, and dynamic identification, logging, and reporting of application events. In particular, the application event system is an improvement over existing solutions to the application event identification, logging, and reporting issues identified herein, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for identifying, logging and reporting application events in an electronic network 100, in accordance with an embodiment of the invention. As shown in FIG. 1A, the distributed computing environment 100 contemplated herein may include a system 130 (i.e., an application event system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for identifying, logging and reporting application events in an electronic network, in accordance with an embodiment of the invention. In some embodiments, a system (e.g., similar to one or more of the systems described herein with respect to FIGS. 1A-1C) may perform one or more of the steps of process flow 200. For example, an application event system (e.g., the system 130 described herein with respect to FIG. 1A-1C) may perform the steps of process 200.

As shown in block 202, the process flow 200 may include the step of receiving at least one user interaction associated with at least one application, wherein the user interaction comprises a user identifier associated with a user account and an interaction identifier associated with the at least one user interaction. In some embodiments, the application event system may receive a user interaction, or a plurality of user interactions, from an application associated with an electronic network. For instance, the electronic network may be in communication with a plurality of applications, and each application may communicate through the electronic network to other applications, to a processor, to a database and/or the like, and the application event system may track each of these communications as they are being transmitted.

In some embodiments, the application event system may be configured to track each user interaction within each application associated with the electronic network, such as through the application event system itself automatically collecting the data associated with each user interaction for each application associated with the electronic network. For instance, such data that may be collected by the application event system may collect each user interaction within each application by tracking each communication from the application to another application, processor, database, and/or the like. Such user interactions may comprise at least a user identifier and an interaction identifier.

In some embodiments, the user identifier is a globally unique identifier (GUID), which is unique to the user account associated with the user generating the interaction. Such a GUUID may comprise a unique 32-bit or 128-bit text string which may be used by the application event system to identify the user account associated with the user interaction. In some embodiments, the interaction identifier may comprise a universally unique identifier (UUID), which is unique to the interaction for each application such that the user interaction can be tracked within the application event system. Such a UUID may comprise a unique 36-bit string to identify each user interaction for each application associated with the electronic network.

As shown in block 204, the process flow 200 may include the step of determining at least one interaction keyword based on the at least one user interaction. In some embodiments, the application event system may determine an interaction keyword based on the received user interaction. For instance, an interaction keyword may be determined using an interaction keyword list, which may comprise a plurality of keywords and a plurality of associated user interactions. In some embodiments, the received user interaction may be compared against the user interactions of the keyword lists, which may then (once the received user action is matched to a user interaction of the keyword list) be mapped to an associated interaction keyword.

In some embodiments, the interaction keyword list may be organized based on each application associated with the electronic network. For instance, the interaction keyword list may comprise the same keywords and the same user interactions across different applications, but may be separated based on each particular application. By way of non-limiting example, when a user interaction is received by the application event system, an application identifier may also be received which will indicate the application the user interaction is from, then the application event system may compare the received user interaction to the specific application interaction keyword list to determine the interaction keyword (i.e., the application specific keyword).

As shown in block 206, the process flow 200 may include the step of generating a specific interaction log comprising the at least one user interaction and the at least one interaction keyword. In some embodiments, the application event system may generate the specific interaction log based on each of the determined user interactions and the associated interaction keywords for all the received user interactions received by the application event system. In this manner, the application event system may generate a complete specific interaction log comprising all the interaction keywords and each associated user interaction for each application associated with the electronic network.

As shown in block 208, the process flow 200 may include the step of generating a query dashboard comprising at least a plurality of interaction logs, wherein the plurality of interaction logs comprises at least the specific interaction log and an associated application identifier based on the at least one application and at least a second interaction log associated with at least a second application. By way of example, the application event system may generate a query dashboard which may receive targeted query requests for each application, for each user interaction, and/or for each user identifier. Specifically, the query dashboard may be generated by the application event system to comprise all the interaction logs and associated data, such that the query dashboard comprises at least one database and/or a plurality of databases comprising each of the data associated with each application of the electronic network. Thus, the query dashboard may use targeted queries provided by a user of the application event system (e.g., a user associated with the manager of the application event system, a user associated with a client of the application event system, and/or the like) to provide a visual display of at least one of a specified user interaction for a specified application, all the user interactions for a specified application, all the user identifiers associated with a specified application, and/or the like.

In some embodiments, the application event system may generate a query response interface component, which may comprise the data requested in the query request received by the query dashboard. For instance, the query response interface component may be generated by the application event system to configure the graphical user interface of the user device associated with the user that submitted/generated the query request in the query dashboard. Thus, such a query response interfaced component may be transmitted from the application event system, over a network (e.g., network 110 of FIG. 1A), to the user device associated with the query request.

In some embodiments, the query request may comprise a success rate query, which is described in further detail below with respect to FIG. 4.

In some embodiments, and as shown in block 210, the process flow 200 may include the step of generating an interaction index for the plurality of interaction logs based on an associated application of each interaction keyword, wherein the interaction index comprises data associated with each interaction log of the plurality of interaction logs. In some embodiments and based on the generation of the specific interaction log, the application event system may generate the interaction index to comprise all the data associated with each application.

In some embodiments, the interaction index may monitor each of the user interactions received at each application associated with the electronic network, may monitor each of the requests queried within the application event system and may be used by the application event system to store the interaction logs used to determine the query response. Thus, in some embodiments, the interaction index may comprise all the data of the interaction logs (e.g., application identifier, user identifier, interaction identifier, interaction keywords, key events, successes and failures, success ratings, and/or the like). In some embodiments and upon receiving a query request at the query dashboard, the application event system may transmit the query request to the interaction index and then may receive, from the interaction index, the query response comprising at least one interaction log for the application of the query request. Such an interaction index may further comprise the interaction logs for all the applications associated with the electronic network.

And in some embodiments, the interaction index may be a Splunk® tool, which may be used for monitoring and observing the applications associated with the electronic network and collecting each of the data provided, generated, and received within and from the application event system.

FIG. 3 illustrates a process flow 300 for generating a key event report, in accordance with an embodiment of the invention. In some embodiments, a system (e.g., similar to one or more of the systems described herein with respect to FIGS. 1A-1C) may perform one or more of the steps of process flow 300. For example, an application event system (e.g., the system 130 described herein with respect to FIG. 1A-1C) may perform the steps of process flow 300.

As shown in block 302, the process flow 300 may include the step of generating, based on the at least one interaction keyword and the application identifier, at least one key event. In some embodiments, the application event system may generate the key event based on the determined interaction keyword and the application identifier, where the key event may be generated to be application specific for each user interaction. Similar to the process described above with respect to FIG. 2, the application event system may determine each key event based on the application specific keywords which are determined by the interaction keyword list and the user interaction.

In some embodiments, the generated key event may be used to generate a report to automatically send to a user of the application event system (e.g., a manager of the application event system, a client of the application event system, and/or the like), which is similar to the key event report discussed in further detail below. For instance, and where a key event indicates a process within the application has been completed (e.g., a final step in the application process has been completed by a user of the application), the application event system may determine—from the keyword of the user interaction completing the application process-a completion key event has occurred, and a report may be automatically generated to show an updated success rate for the application. Such a success rate is described in further detail below with respect to FIG. 4.

As shown in block 304, the process flow 300 may include the step of storing the at least one key event with the user identifier and the interaction identifier. In some embodiments, the application event system may store each generated key event for each application associated with the electronic network, where the storage of the key event, the associated user identifier, and the associated interaction identifier for each application may be organized within a database based on the associated application. In some embodiments, the application event system may store the key event and associated data in the database associated with the query database or in a specified database specifically designed to store the key event data based on the key events for each application.

As shown in block 306, the process flow 300 may include the step of generating a key event report associated with the application identifier, where the key event report comprises each user identifier and each interaction identifier associated with the application. In some embodiments, the application event system may generate the key event report for each application, where the key event report is based on each generated key event associated with each application identifier. Thus, the application event system may generate a plurality of key event reports, where each key event report comprises each user identifier and each associated interaction identifier for each application.

In some embodiments, the key event report may be application specific and may comprise all the key events to have occurred in the specific application by at least one user and over a specified time period. Such a specified time period may be predetermined by a user of the application event system, such as a manager of the application event system, a client of the application event system, and/or the like. In some embodiments, the key event report may comprise all the key events, all the user identifiers for each key event, and all of the interaction identifiers for the application since the application event system first started tracking the user interactions of the application. In this manner, the application event system may generate a complete report of all the key events and all the associated user interactions for each application.

FIG. 4 illustrates a process flow 400 for determining and using a success rating and a success rating threshold, in accordance with an embodiment of the invention. In some embodiments, a system (e.g., similar to one or more of the systems described herein with respect to FIGS. 1A-1C) may perform one or more of the steps of process flow 400. For example, an application event system (e.g., the system 130 described herein with respect to FIG. 1A-1C) may perform the steps of process 400.

As shown in block 402, the process flow 400 may include the step of receiving a query request comprising a success rate query associated with an application identifier associated with the plurality of interaction logs. In some embodiments, the application event system may receive the query request comprising a success rate query for a specific application, where the success rate query may comprise a request by a user of the application event system to see the current success rate of the application. In some embodiments, such a success rate may be based on how many application processes have been completed within the application and/or based on how many application processes have been completed and have a positive response (e.g., an accepted application process). The success rating is described in further detail below with respect to block 404.

In some embodiments, the success rate query and other such query requests may comprise a three-part-key. By way of non-limiting example, the three-part-key may comprise a combination of identifiers (e.g., an application identifier, user identifier, an interaction identifier, a keyword identifier, and/or the like) and/or a specific key event, where the combination of identifiers and/or specific key events may be combined to form a three-part-key query request. For instance, a query request may comprise a three-part combination of identifier(s) and/or key event(s), such as a query request comprising a specific application, a specific user identifier, and a specific key event which may be entered into the application event system as specific identifiers. Similarly, and by way of non-limiting example, the query request could also comprise a combination of a specific application, a specific user identifier, and a specific interaction identifier. In both examples, the three-part-key may be used to specifically identify an application, a specific user associated with the application, and a specific interaction of the user within the application.

As shown in block 404, the process flow 400 may include the step of outputting a query response comprising a success rating of the application, wherein the success rating is based on the plurality of interaction logs associated with the application. In some embodiments, the application event system may output a query response based on the success rate query, where the query response may comprise a determined success rating of the application identified in the success rate query. For instance, the success rating may be based on the overall success of the identified application by analyzing each of the interaction logs for the application, where there may be one interaction log or a plurality of interaction logs for the application. Such interaction logs, and their associated interaction keywords and key events, may be used by the application event system to determine the overall success rating of the application.

In some embodiments, and as discussed briefly above, such a success rating may be based on how many application processes have been completed within the application (e.g., such as an application process directed to the filling out of a forgiveness request form, a protection request form for a resource transaction, and/or the like). By way of non-limiting example, the application event system may track the successes for each application based on the key events generated from the user interactions and associated interaction keywords. In some embodiments, the success rating may comprise the current number of successful application processes out of the overall currently pending application processes (e.g., the application processes that have been started, but not completed). In some embodiments, the success rating may comprise the number of accepted application processes (e.g., those application processes that have been completed and a positive response from the client of the application event system or the application itself has generated, such as a response comprising the forgiveness and/or protection grant associated with the examples provided above) out of the total number of completed application processes (e.g., the completed application processes which generated a positive and negative response).

As shown in block 406, the process flow 400 may include the step of determining whether the success rating of the application fails to meet a success rating threshold. In some embodiments, the application event system may compare the success rating of the application with a success rating threshold to determine whether the success rating fails to meet or meets the success rating threshold. Such a success rating threshold may be pre-determined by a user of the application event system, such as a manager of the application event system, a client of the application event system, and/or the like, where the success rating threshold may be used to determine whether there is a current problem with the application if the success rating does not meet or exceed the success rating threshold. In some embodiments, the success rating threshold may be high, such as 90%, 91%, 92%, 93%, 94%, 95%, 96%, 97%, 98%, or 99%, or any such percentage there-between. A person of skill in the art will understand that the success rating and success rating threshold may be a percentage value, a numerical value, and/or the like, which may describe the overall success of each application.

In some embodiments, the success rating and whether it does not meet, does meet, or does exceed the success rating threshold, may be written and stored in the interaction index (described in detail above), such that the application event system may track each instance of the application's ability to meet the success rating threshold. Thus, the application event system may track each instance of success and failure of the application processes, and each instance where the overall success rating for the application has met or has not met the success rating threshold.

In some embodiments, and as shown in block 408, the process flow 400 may include the step of generating, based on the success rating failing to meet the success rating threshold, a failure alert interface component to configure a graphical user interface of a user device, wherein the failure alert interface component comprises the success rating of the application and the application identifier. In some embodiments, the application event system may generate a failure alert interface component comprising at least the success rating of the application and the application identifier, where the failure alert interface component may be transmitted from the application event system, over a network (e.g., network 110 of FIG. 1A), to a user device of the application event system such as user device associated with a manager of the application event system, a user device associated with a client of the application event system, and/or the like. Further, and in some embodiments, the failure alert interface component may comprise other data of the interaction logs for the application, such as each user identifier and each associated interaction identifier, each key event, each keyword identifier, and/or the like, such that the failure alert interface component comprises all the data needed to determine why the application's success rating failed to meet the success rating threshold.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for identifying, logging and reporting application events, the system comprising:
    a memory device with computer-readable program code stored thereon;
    at least one processing device operatively coupled to the at least one memory device and at least one communication device, wherein executing the computer-readable program code is configured to cause the at least one processing device to:
    receive at least one user interaction associated with at least one application, wherein the user interaction comprises a user identifier associated with a user account and an interaction identifier associated with the at least one user interaction;
    determine at least one interaction keyword based on the at least one user interaction;
    generate a specific interaction log comprising the at least one user interaction and the at least one interaction keyword; and
    generate a query dashboard comprising at least a plurality of interaction logs, wherein the plurality of interaction logs comprises at least the specific interaction log and an associated application identifier based on the at least one application and at least a second interaction log associated with at least a second application.

2. The system of claim 1, wherein the user identifier is a globally unique identifier.

3. The system of claim 1, wherein the interaction identifier is a universally unique identifier.

4. The system of claim 1, wherein the at least one interaction keyword is based on a comparison of the at least one user interaction to an interaction keyword list.

5. The system of claim 4, wherein the interaction keyword list comprises a list of application specific keywords, and wherein the list of application specific keywords comprise at least one specific keyword for a plurality of applications.

6. The system of claim 5, wherein the processing device is further configured to:
    generate, based on the at least one interaction keyword and the application identifier, at least one key event;
    store the at least one key event with the user identifier and the interaction identifier; and generate a key event report associated with the application identifier, wherein the key event report comprises each user identifier and each interaction identifier associated with the application.

7. The system of claim 1, wherein the processing device is further configured to:
receive a query request comprising a success rate query associated with an application identifier associated with the plurality of interaction logs;
output a query response comprising a success rating of the application, wherein the success rating is based on the plurality of interaction logs associated with the application; and
determine whether the success rating of the application fails to meet a success rating threshold.

8. The system of claim 7, wherein the processing device is further configured to generate, based on the success rating failing to meet the success rating threshold, a failure alert interface component to configure a graphical user interface of a user device, wherein the failure alert interface component comprises the success rating of the application and the application identifier.

9. The system of claim 8, wherein the failure interface component further comprises an application specific interaction log, wherein the application specific interaction log comprises each user interaction associated with the application and each user identifier associated with each user interaction.

10. The system of claim 7, wherein the query dashboard comprises a three-part-key associated with the query request.

11. The system of claim 1, wherein the processing device is further configured to generate an interaction index for the plurality of interaction logs based on an associated application of each interaction keyword, wherein the interaction index comprises data associated with each interaction log of the plurality of interaction logs.

12. A computer program product for identifying, logging and reporting application events, wherein the computer program product comprises at least one non-transitory computer-readable medium having computer-readable program code portions embodied therein, the computer-readable program code portions which when executed by a processing device are configured to cause a processor to:
receive at least one user interaction associated with at least one application, wherein the user interaction comprises a user identifier associated with a user account and an interaction identifier associated with the at least one user interaction;
determine at least one interaction keyword based on the at least one user interaction;
generate a specific interaction log comprising the at least one user interaction and the at least one interaction keyword; and
generate a query dashboard comprising at least a plurality of interaction logs, wherein the plurality of interaction logs comprises at least the specific interaction log and an associated application identifier based on the at least one application and at least a second interaction log associated with at least a second application.

13. The computer program product of claim 12, wherein the at least one interaction keyword is based on a comparison of the at least one user interaction to an interaction keyword list.

14. The computer program product of claim 13, wherein the interaction keyword list comprises a list of application specific keywords, and wherein the list of application specific keywords comprise at least one specific keyword for a plurality of applications.

15. The computer program product of claim 14, wherein the processing device is further configured to cause the processor to:
generate, based on the at least one interaction keyword and the application identifier, at least one key event;
store the at least one key event with the user identifier and the interaction identifier; and
generate a key event report associated with the application identifier, wherein the key event report comprises each user identifier and each interaction identifier associated with the application.

16. The computer program product of claim 12, wherein the processing device is further configured to cause the processor to:
receive a query request comprising a success rate query associated with an application identifier associated with the plurality of interaction logs;
output a query response comprising a success rating of the application, wherein the success rating is based on the plurality of interaction logs associated with the application; and
determine whether the success rating of the application fails to meet a success rating threshold.

17. A computer-implemented method for identifying, logging and reporting application events, the computer-implemented method comprising:
receiving at least one user interaction associated with at least one application, wherein the user interaction comprises a user identifier associated with a user account and an interaction identifier associated with the at least one user interaction;
determining at least one interaction keyword based on the at least one user interaction;
generating a specific interaction log comprising the at least one user interaction and the at least one interaction keyword; and
generating a query dashboard comprising at least a plurality of interaction logs, wherein the plurality of interaction logs comprises at least the specific interaction log and an associated application identifier based on the at least one application and at least a second interaction log associated with at least a second application.

18. The computer-implemented method of claim 17, wherein the at least one interaction keyword is based on a comparison of the at least one user interaction to an interaction keyword list.

19. The computer-implemented method of claim 18, wherein the interaction keyword list comprises a list of application specific keywords, and wherein the list of application specific keywords comprise at least one specific keyword for a plurality of applications.

20. The computer-implemented method of claim 19, wherein the computer-implemented method further comprises:
generating, based on the at least one interaction keyword and the application identifier, at least one key event;
storing the at least one key event with the user identifier and the interaction identifier; and
generating a key event report associated with the application identifier, wherein the key event report comprises each user identifier and each interaction identifier associated with the application.

* * * * *